United States Patent
Sarma et al.

(10) Patent No.: US 7,765,253 B1
(45) Date of Patent: Jul. 27, 2010

(54) OBJECT NAME SYSTEM

(75) Inventors: Sanjay Sarma, Belmont, MA (US);
Daniel W. Engels, Lincoln, MA (US);
Erik L. Nygren, Somerville, MA (US);
Joseph T. Foley, Cambridge, MA (US);
David L. Brock, Natick, MA (US);
Kai-Yeung Sai, Hong Kong (HK)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/249,195

(22) Filed: Oct. 10, 2008

Related U.S. Application Data

(63) Continuation of application No. 10/769,291, filed on Jan. 30, 2004, now abandoned.

(60) Provisional application No. 60/444,095, filed on Jan. 31, 2003.

(51) Int. Cl.
*G06F 15/16* (2006.01)

(52) U.S. Cl. .................................. 709/200; 709/245
(58) Field of Classification Search ................. 709/245
See application file for complete search history.

(56) References Cited

U.S. PATENT DOCUMENTS

| 2002/0161745 A1* | 10/2002 | Call .......................... 707/1 |
| 2003/0234775 A1* | 12/2003 | Capurso et al. ............. 345/204 |
| 2004/0155106 A1* | 8/2004 | Schmidtberg et al. ....... 235/383 |

\* cited by examiner

*Primary Examiner*—Thu Nguyen
*Assistant Examiner*—Tauqir Hussain
(74) *Attorney, Agent, or Firm*—Dann, Dorfman, Herrell and Skillman, P.C.

(57) ABSTRACT

An object name system (ONS) for locating one or more servers associated with an Electronic Product Code (EPC) is described. The system utilizes translation format strings to translate an EPC to an EPC domain prefix. The ONS server matches the EPC number to the address of a second server which has extensive information about the product. The second server recognizes the incoming EPC's as belonging to a particular object or service.

12 Claims, 6 Drawing Sheets

OBJECT NAME SYSTEM

CROSS REFERENCE TO RELATED APPLICATIONS

This application is a continuation of U.S. application Ser. No. 10/769,291, filed Jan. 30, 2004 now abandoned which claims priority under 35 U.S.C. §119(e) to provisional application No. 60/444,095 filed Jan. 31, 2003; the disclosures of which are hereby incorporated by reference.

STATEMENT REGARDING FEDERALLY SPONSORED RESEARCH

Not Applicable.

FIELD OF THE INVENTION

The present invention relates generally to a network service and related apparatus and more particularly to a service for identifying objects based upon a unique code associated with that object.

BACKGROUND OF THE INVENTION

As is known in the art, the ability to uniquely identify items, devices, and services (collectively called objects) is desirable in many applications including but not limited to security access control, supply chain management and communications. One embodiment of a system which may be used as part of an application presented above is described in co-pending U.S. patent application Ser. No. 09/379,187 filed on Aug. 20, 1999 which claims the benefit of application No. 60/097,254 filed Aug. 20, 1998.

The inability to uniquely identify every object of interest renders many of these applications less effective than is generally desired. One component required for unique identification is the association of a unique identifier with the object. The identifier may take many forms, such as a given name or number (e.g., a social security number) or a characteristic of the object (e.g. a fingerprint). Once objects are uniquely identified, it would be desirable to locate data about the object or service using the unique identifier.

SUMMARY OF THE INVENTION

In accordance with the present invention, an object name service (ONS) for locating one or more servers associated with an Electronic Product Code (EPC) is provided. The ONS utilizes translation format strings to translate an EPC to an EPC domain prefix. The ONS server matches the EPC number to the address of a second server which has extensive information about the product. The second server recognizes the incoming EPCs as belonging to a particular object or service.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
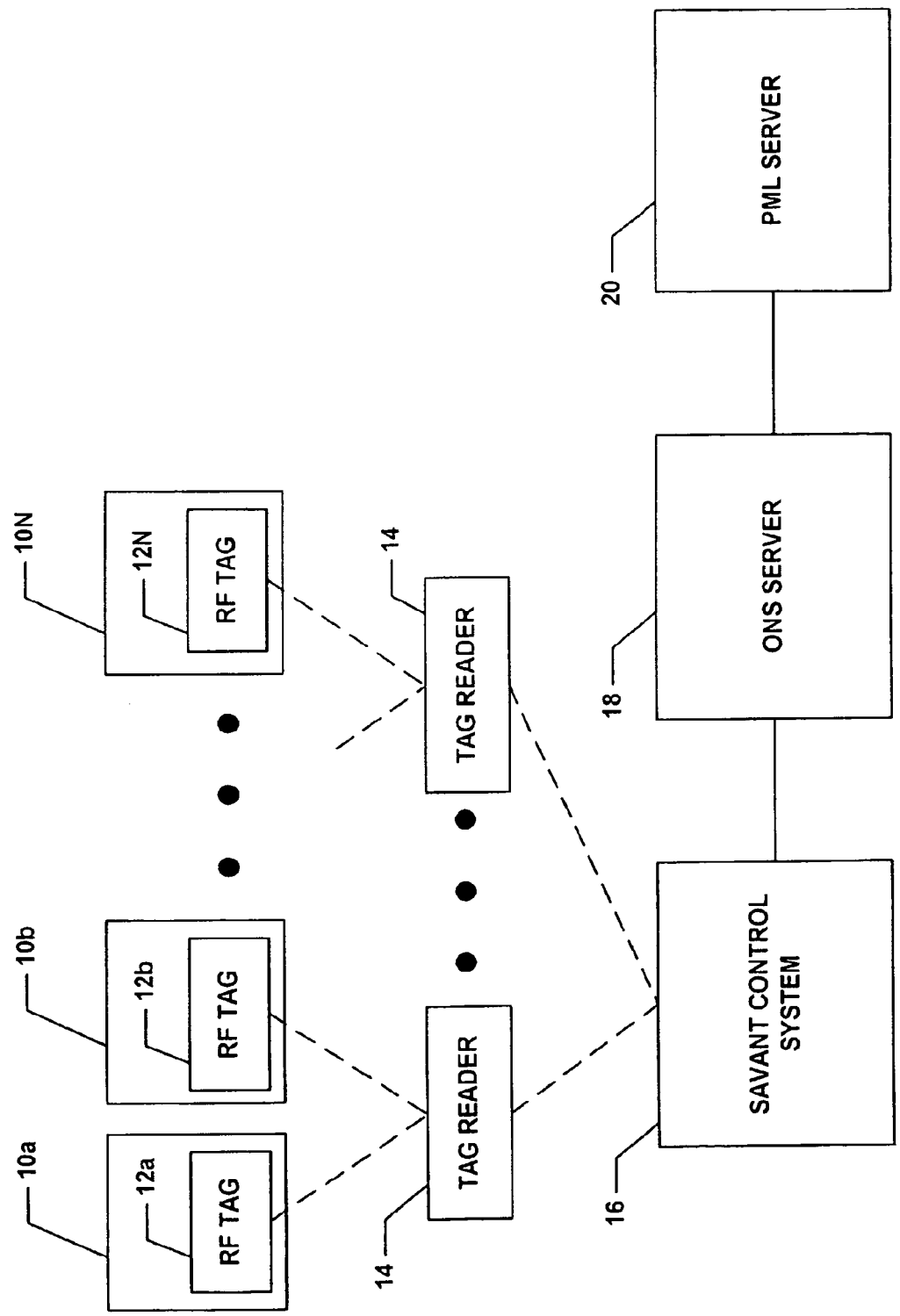
FIG. 1 is a block diagram of an automatic identification (auto-ID) system.

Referring now to FIG. 1, each of a plurality of objects 10a-10N has an electronic product code (EPC) 12a-12N associated with or "tagged" thereon. In one embodiment, each EPC is unique and is associated with a single object via a radio frequency identification (RFID) tag in which case the EPC can be said to be provided as an RFID. It should be appreciated, however, that the EPC may be associated with or disposed on an object by any means known to those of ordinary skill in the art.

The tags taken together with a reader system 11 comprise an auto-identification (auto-ID) system. The reader system 13 includes a plurality of readers 14 adapted to read the EPC's in a tag, preferably without manual intervention. For example, in the case in which RFID tags are used, the readers 14 can be provided as radio-frequency sensors which can detect all RFID's within a certain detection range around the reader. One particular technique for reading the tags is described in U.S. patent application Ser. No. 10/769,299 filed on even date herewith entitled "Security and Data Collision Systems and Related Techniques For Use With Radio Frequency Identification Systems" having named inventors Ronald L. Rivest, Sanjay Sarma, Daniel Engels and Stephen A. Weis hereby incorporated herein by reference in its entirety.

The readers 14 collect the EPCs and provide the EPCs to a control system 16. It should be appreciated that the location of the readers 14 are known and thus when the readers transmit the EPCs to the control system 16, the control system also has information as to the location of the object associated with the EPC. The control system 16 may be provided as a computer system executing an operating environment referred to herein as Savant. The Control System is described in U.S. patent application Ser. No. 10/769,292 filed on even date herewith entitled "Method and Apparatus for Routing Data In An Automatic Identification System" having named inventors Sanjay Sarma, Laxmiprasad Putta, Sridhar Ramachandran, Jim Waldrop, and Daniel W. Engels which application is hereby incorporated herein by reference in its entirety. Thus, the readers 14 are in communication with a computer system executing Savant and the readers 14 send Savant the EPCs which have been collected.

The control system 16 is in communication with an Object Name Service (ONS) server 18. The control system sends a query (e.g. over the Internet) to an ONS database, which acts like a reverse telephone directory—the ONS database receives a number and produces an address. In particular, based upon an object's tag EPC, an object can be associated with networked services. A network service is a remote service provided on a network on the Internet or a Virtual Private Network (VPN) to provide and store information regarding that object. The network may, for example, be provided as an intranet, the Internet, a virtual private network (VPN) or any other type of network. A typical network service could offer product information regarding the object.

The ONS provides a framework to locate networked services for tagged objects. Specifically, networked services for an object can be identified based VP on the unique EPC tagged to that object. The ONS framework helps readers, or processing units integrated with the readers, locate these services.

The ONS server matches the EPC number (which may be the only data stored on an RFID tag) to the address of a server having stored thereon information about the object. In some cases the server may have an extensive amount of information about the object stored thereon. This data is available to, and can be augmented by, control systems around the world. In the exemplary embodiment shown in FIG. 1, the ONS service is used to locate Physical Markup Language (PML) servers 20 associated with an EPC. In one embodiment, the PML server 20 can be provided as a web server that serves information about that object in the Physical Markup Language.

The PML server 20 uses PML to store comprehensive data about manufacturers' products. The PML server 20 recognizes the incoming EPCs as belonging to a particular object (e.g. cans of Supercola, Inc.'s Cherry Hydro). Because the system knows the location of the reader which sent the query, the system now also knows which plant produced the cola. If an incident involving a defect or tampering arose for example, this information would make it easy to track the source of the problem and recall the products in question.

Before describing the ONS server 18 in detail, a general overview is provided. Since only the EPC may be stored on the object tag, computers need some way of matching the EPC to information about the associated item. The Object Name Service (ONS) serves this role. The ONS is an automated networking service similar to the Domain Name Service (DNS) that points computers to sites on the World Wide Web.

When an interrogator (e.g., reader 14 in FIG. 1) reads an RFID tag (e.g. RF tag 12a in FIG. 1), the EPC read from the tag is passed on to a control system (e.g. the control system 16 described above). The control system can, in turn, communicate with an ONS on a local network or the Internet to find where information on the product is stored. The ONS points the control system to a server where a file about that product is stored. That file can then be retrieved by the control system, and the information about the product in the file can be forwarded to a company's inventory or supply chain applications.

The Object Name Service handles many more requests than the Web's Domain Name Service. Therefore, companies can maintain ONS servers locally, which will store information for quick retrieval. For example, a computer manufacturer may store ONS data from its current suppliers on its own network, rather than pulling the information off a web site every time a shipment arrives at the assembly plant. The system will also have built-in redundancies. For example, two or more servers will have the same information stored thereon. Thus, if one server with information on a certain product crashes, ONS will be able to point the Control to another server where the same information is stored.

Figure 2:
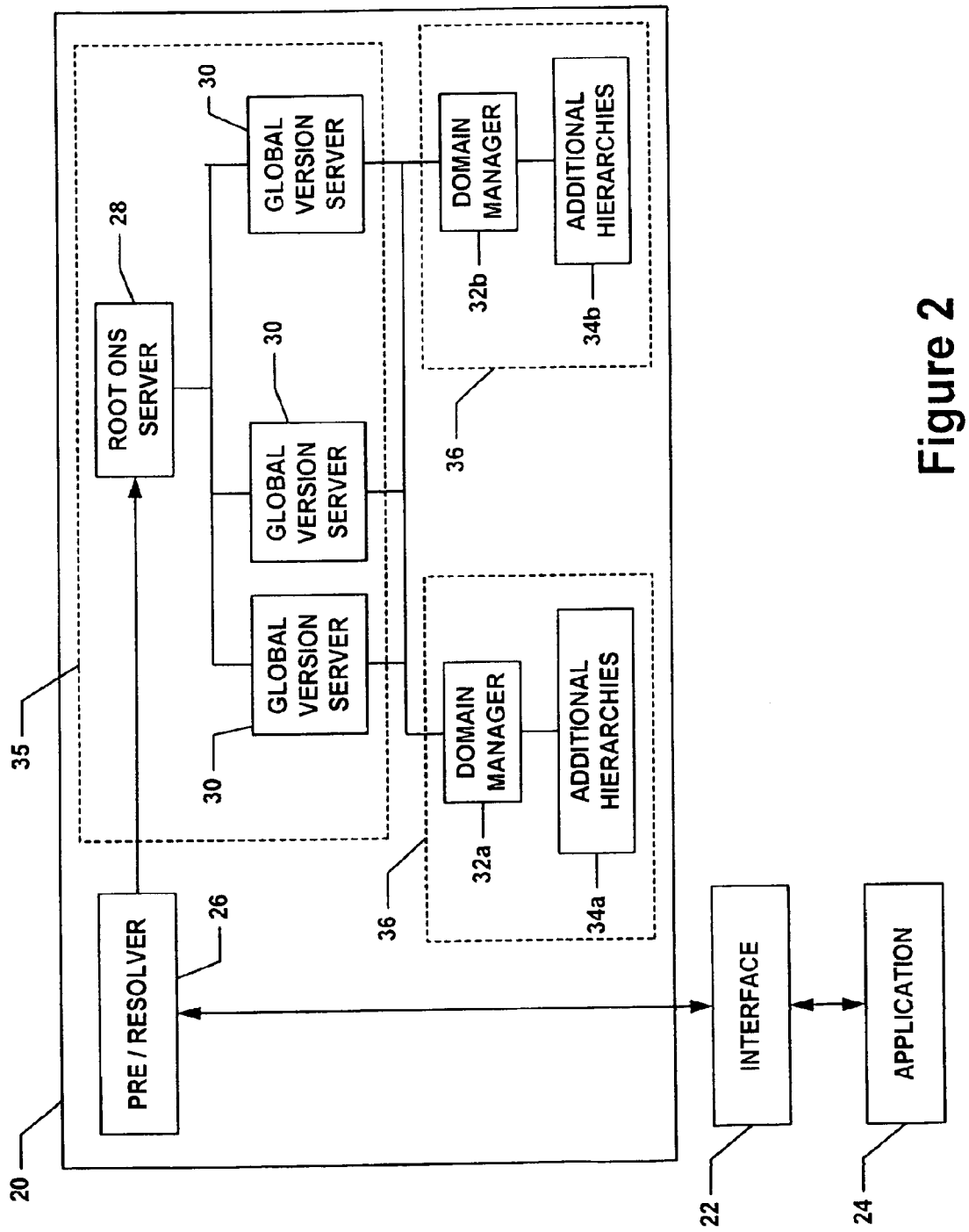
FIG. 2 is a block diagram of object name service (ONS) server.

Proceeding now with detailed discussion of the ONS and with reference to FIG. 2, an ONS server 18', which may be similar to the ONS Server 18 discussed above in conjunction with FIG. 1, is coupled through an interface 22 to an application 24. The application 24 corresponds to a control system (e.g. control system 16 in FIG. 1) at a particular location. For example, in the case where the auto-ID system is provided as part of a supply chain management system, the application or control system may be implemented in a particular store, or a warehouse, or some other location in the supply chain. On the other hand, in the case where the auto-ID system is provided as part of an airport luggage tracking system, the application or control system may be implemented in an airport or in a plane or in some other location along the path on which luggage is carried from one location to another. The interface 22 may be provided, for example, as an application programming interface (API).

The application 24 receives the EPC and provides the EPC through interface 22 to a pre/resolver 26 of the ONS 18'. The pre/resolver 26 takes the EPC and places the EPC into a format compatible with a root ONS server 28, such as a domain name address. One particular technique for placing the EPC in a format compatible with a root ONS server 28 will be described below. The ONS server 28 is part of a hierarchical naming structure including global version servers generally denoted 30, domain managers generally denoted 32 and additional hierarchies generally denoted 34. Once the ONS server 28 receives the domain name address, the ONS server 28 locates the other servers in the hierarchy for that particular EPC. It should be appreciated that in some embodiments, the pre/resolver function can be incorporated into and performed by the root server 28.

It should also be appreciated that root server 28 and global servers 30 (together denoted by reference number 35) are controlled by a central authority (e.g. an Auto-ID Center) while the remainder of the hierarchy (denoted with reference number 36) can be controlled by individual companies. Thus a company can provide its own server customized to the company's particular environment or application. For example, domain manager 32a and additional hierarchies 34a could be controlled by a first company (e.g. company "A") in a supply chain management chain and while domain manager 32b and additional hierarchies 34b could be controlled by a second different company (e.g. company "B") in a supply chain management chain.

ONS servers are implemented by appropriately configuring Berkeley Internet Name Domain (BIND) servers. BIND is an open re-distributable reference implementation of the Domain Name System (DNS) protocols. BIND distributions can be obtained from the Internet Software Consortium (ISC).

As discussed above, the resolution of an EPC takes place in two steps. A first step comprises a pre-resolution phase in which the EPC is converted to an EPC domain name (this is accomplished in the pre/resolver 26). The second step comprises a resolution step that uses standard DNS to look up PML servers for the associated EPC.

The EPC domain name comprises an EPC domain prefix that is computed from the EPC, and a constant suffix called the EPC root domain. The EPC root domain is a domain name chosen to be a common domain suffix for ONS accesses chosen by the EPC namespace authority. Currently the EPC root domain is epc.objid.net.

Translation format strings are used to convert EPCs to EPC domain name prefixes during the pre-resolution phase. In one embodiment, a format string is comprised of the digits 0 through 4 and the '.' character. Given an EPC and a format string, the following steps can be used to convert the EPC to an EPC domain prefix.

1. Every character in the format string is replaced with a character derived from the EPC to obtain the EPC domain prefix from the given EPC.

2. A period character (i.e., ".") in the format string is translated to a period character "." in the domain name. The period character "." is used as a separator between labels.

3. A zero character (i.e., "0") in the format string is translated to a zero character "0" in the domain name. The zero character "0" is typically used to left-pad a label in the EPC domain prefix.

4. The digit 'n' in the format string, where n is between 1 and 4, is translated as a base (r) digit in the domain name as follows:
   a. The digit '1' is translated to a binary digit, which is either 0 or 1. This digit corresponds to one bit in the EPC.
   b. The digit '2' is translated to a quaternary digit, which is between 0 and 3. The digit corresponds to two bits in the EPC.
   c. The digit '3' is translated to an octal digit, which is between 0 and 7. The digit corresponds to three bits in the EPC.
   d. The digit '4' is translated to a hexadecimal digit, which is a character between '0' through '9' or 'A' through 'F'. The digit corresponds to four bits in the EPC.

The bit-size of the format string is the sum of the digits present in the format string. For example, the bit-size of the format string 01.44.33.1.1.2 is (0+1+4+4+3+3+1+1+2), which is equal to 19.

The EPC bits assigned to format digits '1' through '4' in the format string are as follows. The format string is parsed label-by-label from right to left. The digit 'n' in the format string is assigned to the highest n unassigned bits in the EPC in the order in which they appear in the EPC.

If the EPC has fewer bits than the size of the format string, the transformation is said to be erroneous. Translation format strings that are not erroneous can be categorized as either complete format strings or partial format strings. A complete format string is one that specifies the translation scheme for all bits in the EPC. A partial format string is one that specifies the translation scheme for only a prefix of the EPC.

Translation format strings provide a general method for translating EPCs to EPC domain name prefixes. Depending upon the version of the EPC, which is usually the first 8 bits of the EPC, the appropriate translation format string is used to perform pre-resolution.

As an example, consider the format string:
   4.4.444.1.1.1.3.3.3.013 and the EPC code:
   0110101001111001011010011100101111010001

First, the format string is reversed by label, to provide a reversed format string. This is necessary since the format string is parsed right-to-left, label-by-label. This results in the reversed format string:
   013.3.3.3.1.1.1.4444.4.4

The reversed format string is applied to the EPC as shown in table 1.

In table 1, the top row is the reversed format string, the second row is the EPC and the third row is the resulting EPC domain prefix in reverse order by label (also referred to as an interim EPC domain name prefix). The EPC (row 2) is aligned with the reversed format string (row 1), with the number in the format string indicating the number of bits of the EPC to be included within the label which corresponds to the number in the format string. As discussed above, the leading zero of the reversed format string is for padding and therefore none of the EPC bits are aligned with the leading zero. The next bit of the reversed format string is the number 1, therefore the first bit (1 bit) of the EPC is aligned with this label. The next bit of the reversed format string is a 3, therefore the next three bits of the EPC are grouped under this number. The periods denote a separation between labels. This process is repeated for the entire reversed format string and EPC.

As shown in the third row, the interim EPC domain name prefix is determined from the grouping of the labels in the second row. The occurrence of empty labels in the EPC row denote a zero or a ".". A 1 bit wide number in the EPC row corresponds to a binary bit in the interim EPC domain prefix row. A two bit wide number in the EPC row corresponds to a quaternary digit in the interim EPC domain prefix row. A three bit wide number in the EPC row corresponds to an octal digit in the interim EPC domain name prefix row and a four bit wide number in the EPC row corresponds to a hexadecimal digit in the interim EPC domain name prefix row. The first label translates to 006, wherein the first zero comes from the empty space in the EPC row, the second zero comprises the digit for the zero in the corresponding EPC column and the six from the octal value for 110 in the next column. The second label translates to 5, the third label translates to 1, the fourth label translates to 7, etc. This interim EPC domain name prefix is the reversed EPC domain name prefix (label-by-label) since the format string was reversed label-by-label in order to obtain the interim EPC domain name prefix. Thus the interim EPC domain name prefix in the third row of table 1 is actually a reversed EPC domain name prefix, and must therefore be reversed label-by-label to obtain a correctly ordered EPC domain name prefix. The resulting EPC domain name prefix (in correct order) is then:
   1.D.69CB.0.1.0.7.1.5.006

The EPC domain name prefix then has the root name appended to it, resulting in an overall EPC domain name of:
   1.D.69CB. 0.1.0.7.1.5.006.epc.objid.net This domain name address is used to obtain additional information regarding the product the PEC was obtained from.

Translation format strings can be stored as TXT records in DNS. This method has the advantage that the authoritative DNS server for that EPC domain suffix can maintain the translation format strings, without hard-coding translation format strings in the resolvers.

Format translation strings can be obtained using DNS lookups on a special info record for the specific version of the EPC. Given an EPC, the format string '44' can be used to obtain the version number of the EPC, denoted as <version-number>. A lookup on TXT records for
   info.<version-number>.<root-domain> will give the format string for the EPC under consideration. For example, the TXT record could look like
   info.80.<root-domain>TXT
   4444.4444.44.4444.2.2.2.2.444444.44 specifying a complete translation format string for a 96-bit EPC having version number 80 hex. The format string '44' that is used to get the EPC's version is hard-coded based on the bits appearing in the EPC.

The information record for an EPC version can contain a complete format string. The ONS resolver can fully translate the EPC to an EPC domain. This method is called direct translation.

TABLE 1

| 0 | 1 | 3 | . | 3 | . | 3 | . | 3 | . | 1 | . | 1 | . | 1 | . | 4 | 4 | 4 | 4 | . | 4 | . | 4 |
|---|---|---|---|---|---|---|---|---|---|---|---|---|---|---|---|---|---|---|---|---|---|---|---|
| 0 | 110 | | 101 | | 001 | | 111 | | 0 | | 1 | | 0 | | 0110 | 1001 | 1100 | 1011 | | 1101 | | 0001 |
| 0 | 0 | 6 | . | 5 | . | 1 | | 7 | . | 0 | . | 1 | . | 0 | . | 6 | 9 | C | B | . | D | . | 1 |

Direct translation requires one DNS lookup to find the translation format string. The format strings are maintained in the <root-domain>. Since ONS resolvers cache records accessed during resolution, the TXT records specifying format strings will be cached for all versions that have been accessed, the cache will answer nearly all format string lookups.

Alternately, the info record for an EPC version can contain a partial format string. The ONS server will lookup info.<incomplete-domain>.<root-domain> record to get a refinement on the domain. This method is called iterative translation. Unlike direct translation, this method may require lookups in different ONS servers to fully translate the EPC.

Iterative translation requires more than one DNS lookup to find the translation format string. Again, the cache will answer most of these queries.

It should also be appreciated that the exemplary embodiment of FIG. 2 depicts a system which is open to the public and thus is referred to as a "global public system" (in the sense that the DNS is a global public system). It should be appreciated, however, that it is also possible to provide a private or local ONS system.

For example, a company which has a large chain of stores (e.g. a nationwide chain of Home Depot stores) may wish to have an ONS system in each store which is local to that store so that information concerning that particular store can be saved in a storage device. In this example, a local ONS system can be used for that store and a private global ONS system can be used for all stores in the nationwide chain. This approach could also be used to partition the stores by geographic regions (e.g. all stores in the U.S., Europe, etc. . . . ) or by some other criteria (e.g. gross sales in a store, etc. . . . ).

In the case where a private ONS is used, a private entity would control servers in blocks 35 and 36 in FIG. 2. Thus, in this case, the address of the root server 28 would only be known in the private organization and access to the address would be protected. The structure of the private ONS could be identical to the public ONS but it could also be provided having any desired hierarchy. In the case where the root server 28 is part of a private ONS, it could also have knowledge of other private or public systems.

Figure 3A:
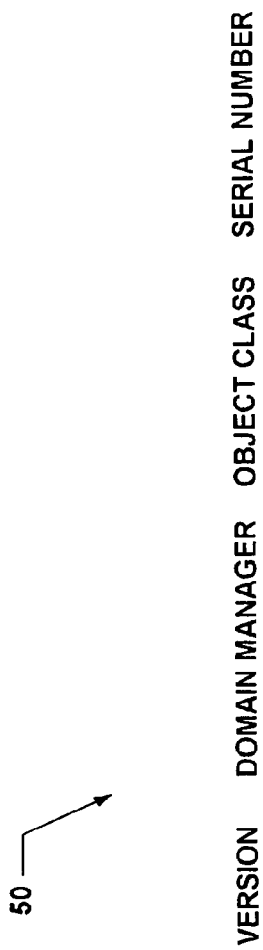
FIGS. 3A and 3B are representations of electronic product codes (EPCs)
Figure 3B:
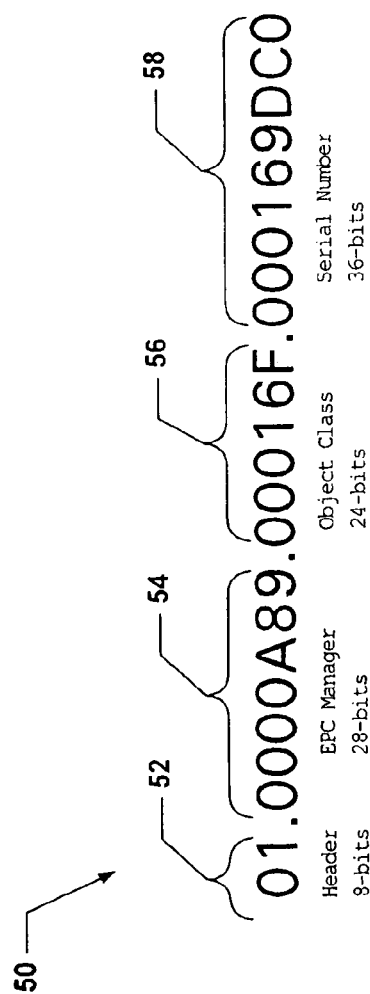

Referring now to FIGS. 3A and 3B, an exemplary EPC 50 is shown. The EPC ideally corresponds to a standard for identifying all products. The EPC has adopted the basic structures of the Global Trade Item Number (GTIN).

The EPC 50 is a number comprising a header 52 and three sets of data 54, 56, and 58, as shown in FIGS. 3A and 3B. The header 52 identifies a version number of the EPC 50. This allows for different lengths or types of EPCs. The second part of the number 54 identifies the EPC Manager, most likely the manufacturer of the product to which the EPC is attached. For example 'The Coca-Cola Company'. The third part 56 of the EPC, called the object class, refers to the exact type of product, most often the Stock Keeping Unit (SKU), for example, "Diet Coke 330 ml can, US version." The fourth part 58 is the serial number, unique to the item. This tells exactly which 330 ml can of Diet Coke is being referred to. This makes it possible, for example, to quickly identify products that might be nearing their expiration date.

EPCs can be provided having any predetermined length. In one embodiment, EPCs of 64 and 96 bits have been proposed. Eventually, there could be more. The 96-bit number for the EPC was selected as a compromise between the desire to ensure that all objects have a unique EPC and the need to keep the cost of the tag down. The 96-bit EPC provides unique identifiers for 268 million companies. Each manufacturer can have 16 million object classes and 68 billion serial numbers in each class, more than enough to cover all products manufactured worldwide for years to come. Since there is no need for that many serial numbers at this time, an interim 64-bit code has been proposed. The smaller code will help keep the price of the RFID chips down initially, while providing more than enough unique EPCs for current needs.

Figure 4:
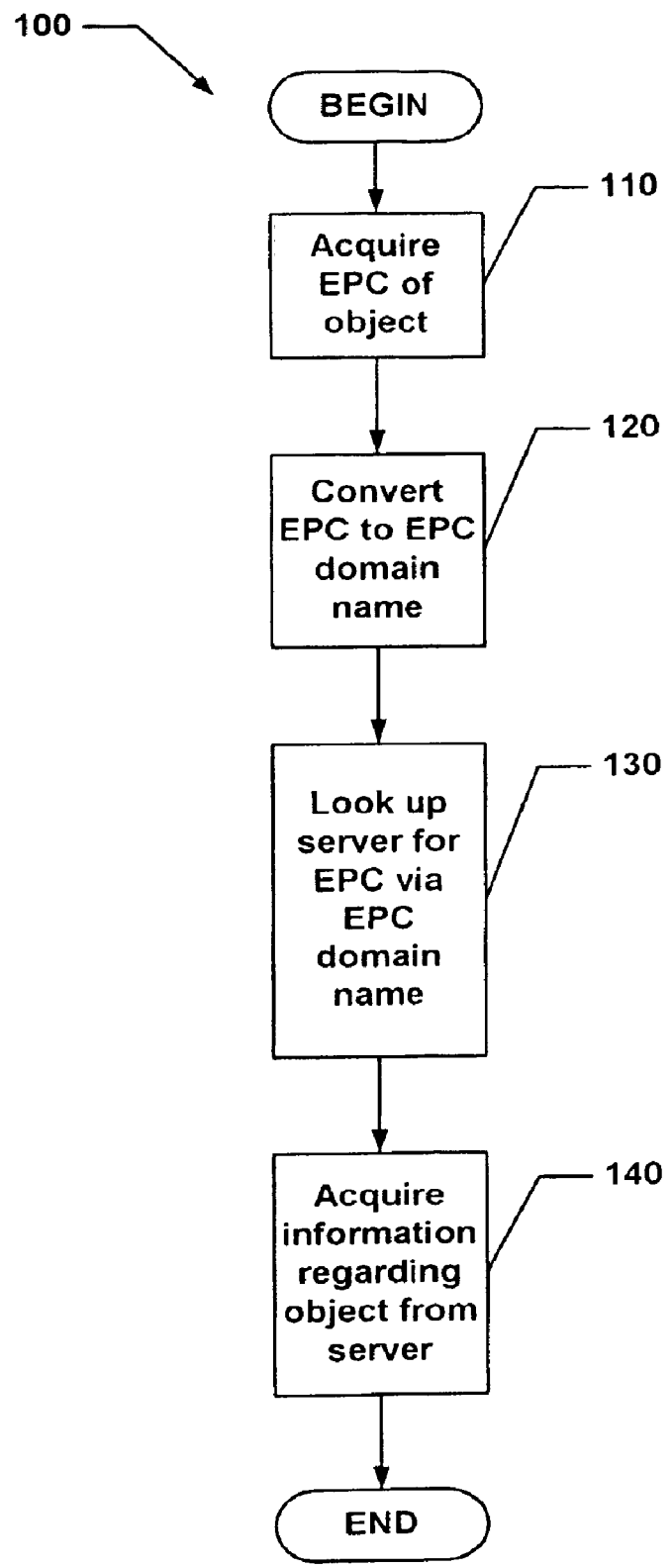
FIG. 4 is a flow chart of the method for identifying objects based on an object's EPC.
Figure 5:
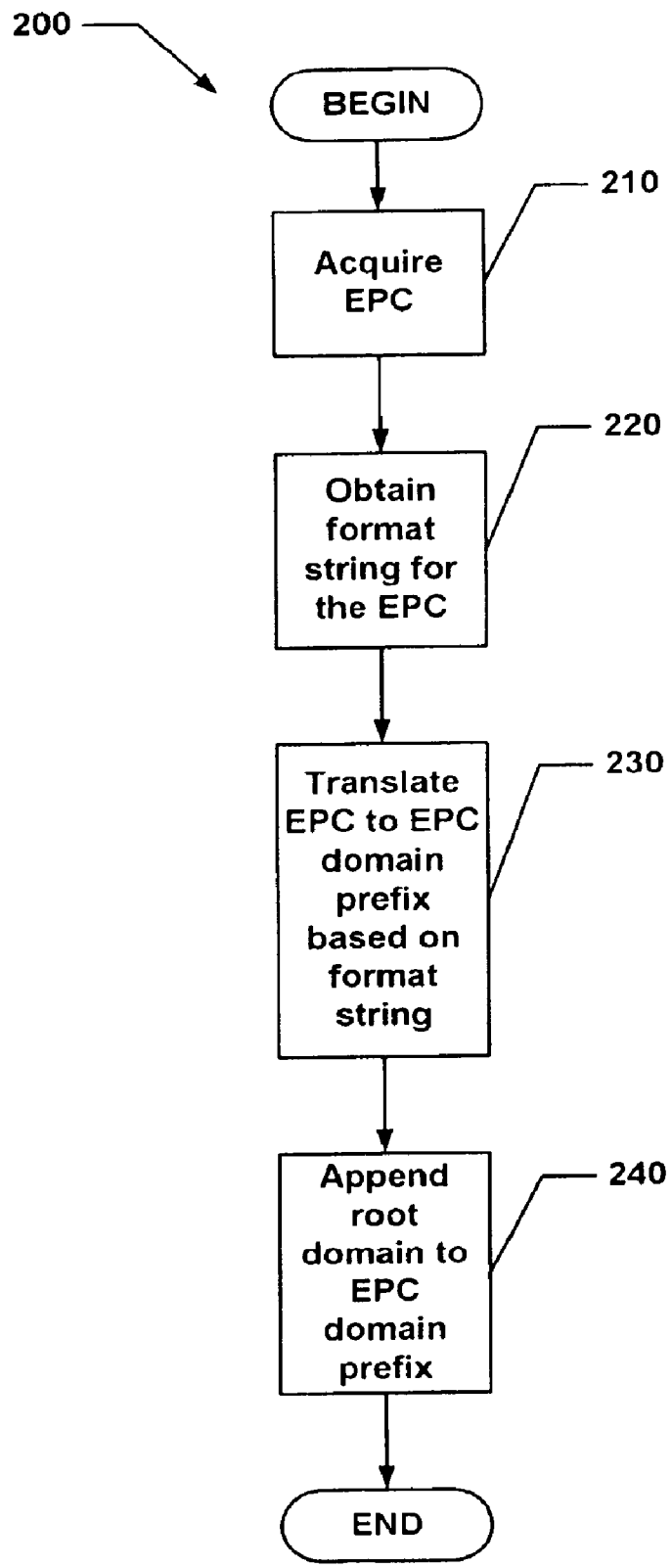
FIG. 5 is a flow chart of a method for performing direct translation of an EPC to an EPC domain name.
Figure 6:
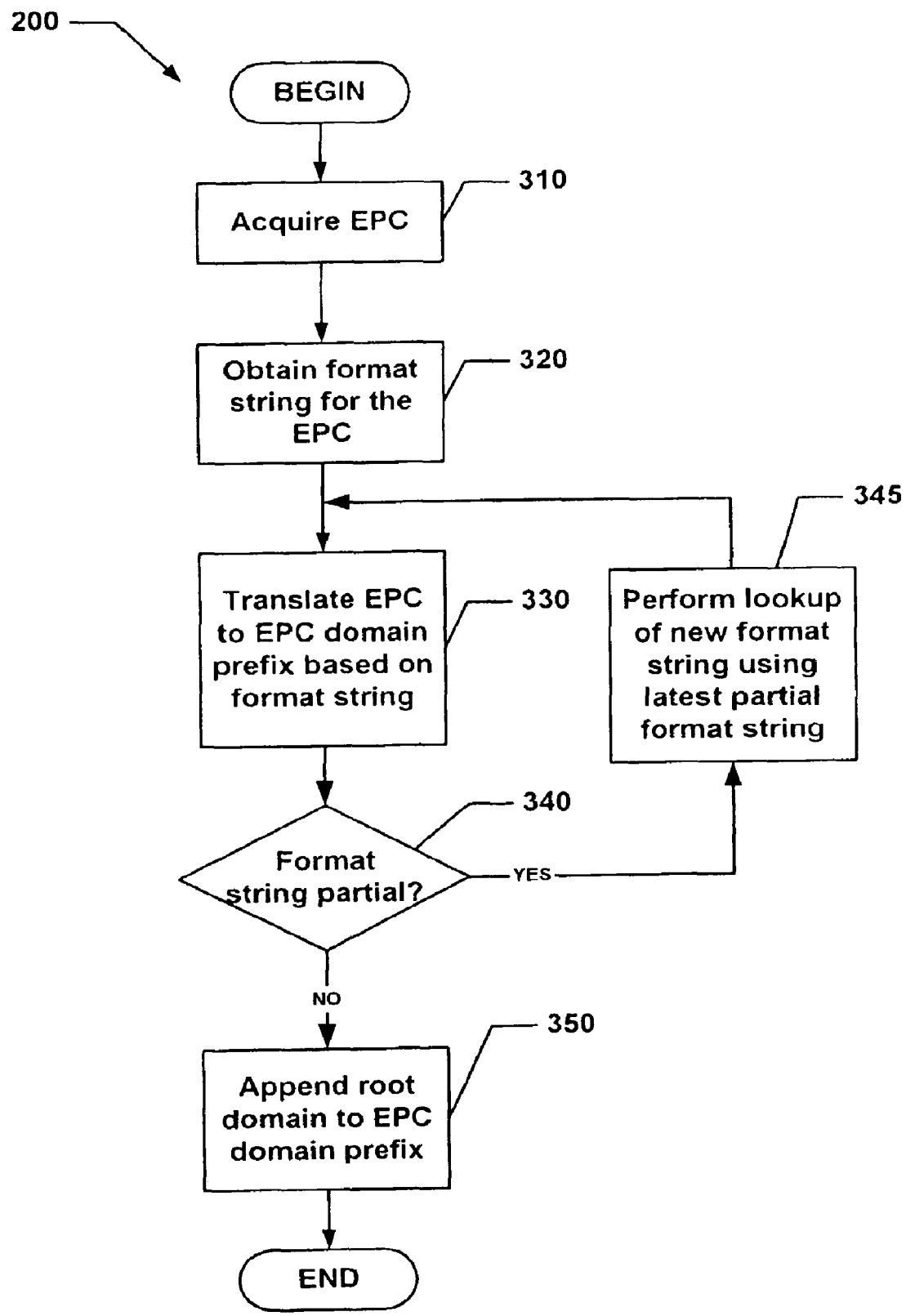
FIG. 6 is a flow chart for the method of performing iterative translation of an EPC to an EPC domain name.

A flow chart of the presently disclosed method is depicted in FIGS. 4-6. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4 a flow chart for the process of performing object identification based on an object's EPC is shown. The method 100 begins and step 110 is executed wherein an EPC of an object is acquired. In a preferred embodiment, the object's EPC is provided by way of an RFID tag which is read over a wireless channel with an RFID reader.

In step 120 the EPC is converted to an EPC domain name. By way of the format string and the EPC a translation of the EPC (described in detail above in conjunction with FIG. 4) is performed. The result of this step is a domain name prefix for the appropriate device from which the EPC was read.

In step 130, the EPC domain name is used to perform a lookup on a server. The server, identified by the EPC domain name, contains information about the product from which the EPC was obtained.

In step 140, the information regarding the product is obtained from the identified server. Following completion of step 140, the process ends.

Referring now to FIG. 5 a flow chart for the process of performing direct translation of an EPC to an EPC domain is shown. The method 200 begins and step 210 is executed wherein an EPC is acquired. In a preferred embodiment the EPC is read from an RFID tag by a reader. In step 220, a format string for the EPC is obtained. The format sting is used to translate the acquired EPC to the corresponding EPC domain name, such that additional information regarding the device associated with the EPC can be obtained.

In step 230, the EPC is translated to the corresponding EPC domain name. By way of the format string and the EPC a translation (described in detail above in conjunction with FIG. 4) is performed. Since this is a direct translation (that is, the format string can be used to translate the entire EPC) this step is only performed once. The result of this step is a domain name prefix for the appropriate device from which the EPC was read.

In step 240, that the root domain is appended to the EPC domain prefix to produce a complete EPC domain name. Using this derived EPC domain name, information regarding the product can be obtained. Following step 240, the process ends.

Referring now to FIG. 6, a flow chart for the process of performing iterative translation of an EPC to an EPC domain is shown. The method 300 begins and step 310 is executed wherein an EPC is acquired. In a preferred embodiment the EPC is read from an RFID tag by a reader.

In step 320, a format string for the EPC is obtained. The format sting is used to translate the acquired EPC to the corresponding EPC domain name, such that additional information regarding the device can be obtained. In this process the format string is not usable to translate the entire EPC to an EPC domain. Thus the format string is used to translate a portion of the EPC to a partial EPC domain name.

In step, 330 the EPC is translated to the corresponding EPC domain name. By way of the format string and the EPC, a translation (described in detail above in conjunction with FIG. 4) is performed. Since this is an iterative translation (that is the format string cannot be used to translate the entire EPC) this step may be performed multiple times. The result of this step is a partial or entire domain name prefix for the appropriate device from which the EPC was read.

In step, 340 a determination is made regarding whether a complete domain name prefix has been produced. When a complete domain name prefix has not been produced, step 350 is performed and steps 330 and 340 repeated.

In step 350, by way of the partial domain name, more of the appropriate format string is acquired. Steps 330, 340 and 350 are repeated until a complete domain name prefix has been determined.

Step 360 is executed once a complete domain name prefix has been determined. Step 360 recites that the root domain is appended to the EPC domain prefix to produce a complete EPC domain name. Using the complete EPC domain name information can be obtained regarding the product from which the EPC was obtained. Following step 360, the process ends.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of retrieving information about an identifier from a physical markup language server by generating a request, said method comprising the following steps:
   a. Providing a format string and an identifier containing characters used for generating the request;
   b. Generating the request by:
      i. Selecting a first character from the format string, wherein the first character is used to determine how many characters in the identifier should be mapped to a first character of the request;
      ii. Selecting a first group of one or more characters from the identifier, wherein the number of characters in the group is based on the value of the first character selected from the format string;
      iii. Setting the request equal to the first group of characters;
      iv. Selecting a second character from the format string, wherein the second character is used to determine how many characters in the identifier should be mapped to a second character of the request;
      v. Selecting a second group of one or more characters from the identifier, wherein the number of characters in the group is based on the value of the second character selected from the format string;
      vi. Adding the second group of characters to the request; and
   c. Using the request to obtain information about the identifier from the physical markup language server.

2. The method of claim 1, comprising the step of converting the first group of characters from a first syntax to a second syntax.

3. The method of claim 1, wherein the format string utilizes a decimal numbering system.

4. The method of claim 1, wherein the identifier utilizes a binary numbering system.

5. The method of claim 1, wherein the request utilizes a hexadecimal numbering system.

6. The method of claim 1, comprising the step of requesting information from the server which is located at a web address provided in the request.

7. The method of claim 1, comprising the step of downloading information related to the identifier from the server at a web address provided in request.

8. The method of claim 1, comprising the step of appending a root name to the request.

9. The method of claim 1, wherein the characters in the format string are selected in a sequential order.

10. The method of claim 1, wherein the characters in the identifier string are selected in a sequential order.

11. The method of claim 1, wherein the identifier is an electronic product code.

12. A method of obtaining information about an identifier from a physical markup language server comprising the following steps:
   a. Sending the identifier containing a first format string to a computer containing a memory;
   b. Storing the identifier in the memory of the computer;
   c. Extracting the first format string from the identifier;
   d. Creating a request using the first format string;
   e. Sending the request to a format server,
   f. Receiving a second format string from the format server;
   g. Creating a second request using the second format string and the identifier by:
      i. Selecting a first character from the second format string, wherein the first character is used to determine how many characters in the identifier should be mapped to a first character of the second request;
      ii. Selecting a first group of one or more characters from the identifier, wherein the number of characters in the group is based on the value of the first character selected from the second format string;
      iii. Setting the second request equal to the first group of characters;
      iv. Selecting a second character from the second format string, wherein the second character is used to determine how many characters in the identifier should be mapped to a second character of the second request;
v. Selecting a second group of one or more characters from the identifier, wherein the number of characters in the group is based on the value of the second character selected from the second format string; and vi. Adding the second group of characters to the second request; and h. Using the second request to obtain information about the identifier from the physical markup language server.

* * * * *